May 20, 1969   S. C. HARRIS, JR   3,445,763
DIGITAL READING IMPEDANCE MEASURING ARRANGEMENT
Filed Oct. 6, 1965

INVENTOR.
SAMUEL C. HARRIS, JR.
BY
HIS ATTORNEY

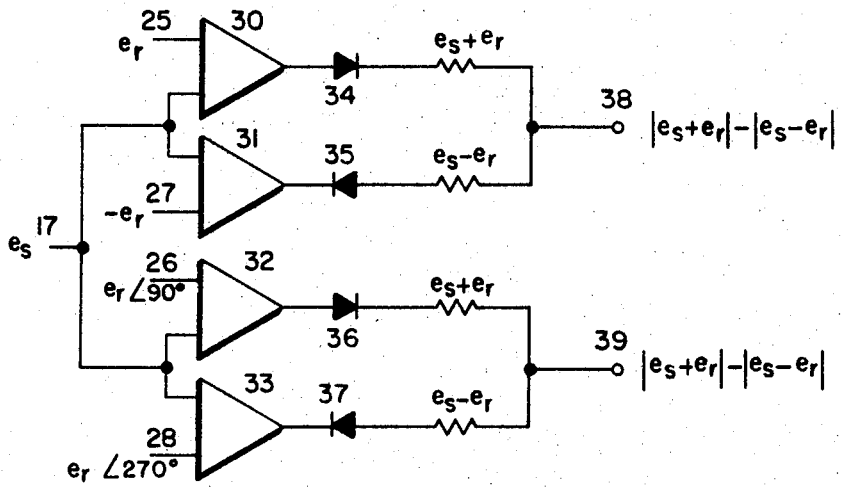
FIG. 3
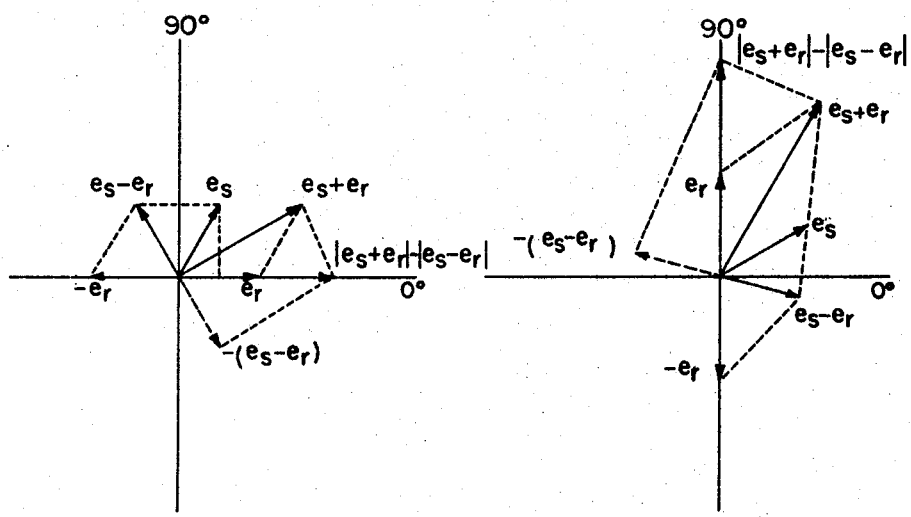
FIG. 4
FIG. 5

United States Patent Office 3,445,763
Patented May 20, 1969

3,445,763
DIGITAL READING IMPEDANCE MEASURING
ARRANGEMENT
Samuel C. Harris, Jr., Waynesboro, Va., assignor to
General Electric Company, a corporation of New
York
Filed Oct. 6, 1965, Ser. No. 493,374
Int. Cl. G01r 27/16, 17/06
U.S. Cl. 324—57                           14 Claims

ABSTRACT OF THE DISCLOSURE

An impedance measuring arrangement comprising a plurality of circuits containing standard and unknown impedances. The output currents of said circuits are compared with a reference signal to produce respective control signals for operational amplifiers included in each of the circuits. Control of the gain of such amplifiers results in a digital indication being provided of the unknown impedance.

---

This invention relates to a measuring circuit. More particularly this invention relates to a circuit for evaluating basic circuit parameters.

Conventional impedance bridge circuits have been widely used to determine electrical parameters of circuit elements. In these circuits an element of unknown parameter magnitude is placed in one leg of the bridge and another variable element in another leg of the bridge is adjusted until a null or zero error signal results at the bridge output. In this condition the bridge is said to be balanced and the value of the adjusted element is proportional to the unknown element. If a reactive element such as a capacitor or an inductor is to be measured two adjustable elements are needed. In the case of inductors, at balance one of the adjustable elements is proportional to inductance and the other to the quality factor. In the case of capacitors one adjustable element at balance is proportional to the capacitance and the other to the dissipation factor. If, however, a resistor is to be measured only one adjustable element is necessary and its value at balance will be proportional to the unknown resistance.

In all of these systems it is sometimes desirable to present the readings of the parameters in digital form. This is because very often the readings are utilized in digital computers or are visually displayed digitally. Additionally it would be advantageous if the adjusting of the variable elements to obtain balance could be done automatically. Systems which balance impedance bridges automatically by digital techniques have been developed but difficulties in accuracy have been encountered especially in handling low impedances.

Accordingly it is an object of the present invention to provide a self-balancing circuit which is an improvement over a conventional impedance bridge circuit.

It is a further object of the present invention to provide a circuit which is an improvement over a conventional impedance bridge and which is automatically balanced through a combination of analog and digital techniques.

It is still another object of this invention to provide a self-balancing circuit arrangement with digital read-out which can be conveniently set to measure capacitance and dissipation factor, inductance and quality factor, or resistance.

These and further objects and advantages of the present invention are achieved, in one form, in a circuit which is an improvement over a conventional impedance bridge circuit and which includes operational amplifiers the gain of which can be automatically varied by feeding back the proper component of the error signal present at the output of the improvement circuit. The component of the error signal related to each parameter under measurement is fed to an up-down digital counting register which controls the gain of the respective operational amplifier. When the circuit reaches a null condition the digital counting register displays the value of the related electrical parameter in digital form.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIGURE 3 is a more detailed illustration of a phase detector used in the circuit of FIGURE 2;

FIGURE 4 is a vector diagram which is helpful in understanding the operation of one part of the phase detector;

FIGURE 5 is another vector diagram which is helpful in understanding the operation of another part of the phase detector;

Figure 1:
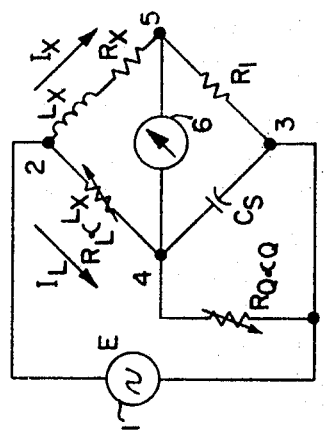
FIGURE 1 is a conventional impedance bridge circuit used to measure the inductance and the quality factor of an unknown inductor.

Referring now to FIGURE 1 there is illustrated a conventional impedance bridge used to measure the inductance and quality factor of an unknown inductor. An A-C signal from a source at 1 is impressed across input terminals 2 and 3 and may be of any convenient magnitude and frequency. An adjustable resistor $R_L$ is connected between the input terminal 2 and an output terminal 4 and the unknown inductor L represented by its equivalent inductance $L_x$ and series resistance $R_x$ is connected between input terminal 2 and output terminal 5. A second adjustable resistor $R_Q$ is connected in parallel with a standard capacitor $C_S$ of fixed value between terminals 4 and 3. The bridge is completed by connecting a fixed resistance $R_1$ between terminals 5 and 3. A null indicating meter 6 is shown connected across terminals 4 and 5. The bridge is balanced by adjusting both $R_L$ and $R_Q$ until the meter 6 registers a null or a zero voltage condition. At balance, as indicated on FIGURE 1, the value of $R_L$ will be proportional to $L_x$ and the value of $R_Q$ will be proportional to Q or the quality factor. For our purposes the quality factor as Q will be defined as the ratio of the reactance to the resistance of the inductor under measurement or $X_x/R_x$. The proportionalities indicated in FIGURE 1 can be proven by the following equations:

(1) $$I_L = \frac{E}{R_L + \frac{jX_s R_Q}{R_Q + jX_s}}$$

(2) $$I_x = \frac{E}{R_x + R_1 + jX_x}$$

(3) $$I_L R_L = I_x(R_x + jX_x)$$

at balance, substituting (1) and (2) in (3) and canceling (4) $$\frac{R_L R_Q + jX_s R_L}{R_Q R_L + jX_s(R_L + R_Q)} = \frac{R_x + jX_x}{R_x + R_1 + jX_x}$$

simplifying and canceling (5) $\quad R_L R_Q R_1 + jX_s R_L R_1 = -X_x X_s R_Q + jX_s R_x R_Q$ equating reals and imaginaries (6) $$R_L = \frac{-X_s}{R_1} X_x = K_1 X_x a L_x$$

for a given frequency (7) $$R_Q = R_1 \frac{R_L}{R_x} = K_2 \frac{R_L}{R_x}$$

substituting (6) in (7)

Figure 2:
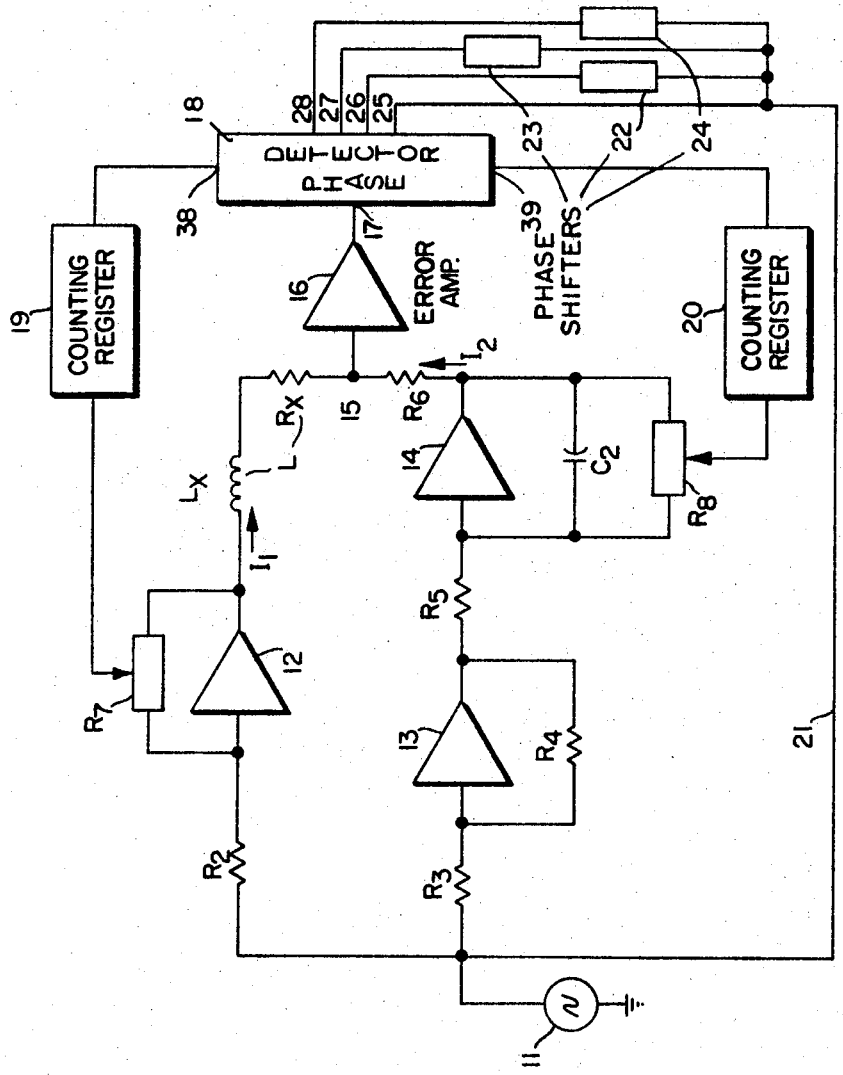
FIGURE 2 is an analog of the circuit of FIGURE 1 in accordance with this invention.

(8) $$R_Q a \frac{X_x}{R_x} = Q$$

where:

$X_s$ = reactance of $C_s$
$X_x$ = reactance of $L$
$K_1$ and $K_2$ represent constants FIGURE 2 shows an analog circuit of the inductance bridge shown in FIGURE 1 which is adapted to be balanced automatically and to present a reading in digital form. A signal generator 11 presents an A-C signal to two operational amplifiers 12 and 13 through their respective input summing resistors $R_2$ and $R_3$. The frequency of the A-C signal may be any convenient value. In a preferred embodiment a frequency of 1,000 c.p.s. was used. As will be apparent the accuracy of the circuit does not depend on precise accuracy of the signal frequency. The operational amplifier 13 has a fixed resistor $R_4$ in its feedback path so that its gain is constant and its function being simply to invert the input signal 180° out of phase with the signal presented to operational amplifier 12. This inverted signal is presented to an operational amplifier 14 through its respective summing resistor $R_5$. The outputs of operational amplifiers 12 and 14 come together at a summing point 15 through an unknown inductor L and a fixed resistor $R_6$ respectively. Due to the fact that the output voltages from operational amplifiers 12 and 14 are 180° out of phase, the currents $I_1$ flowing through the unknown inductor L and $I_2$ flowing through fixed resistor $R_6$ will likewise be out of phase and will tend to cancel each other at the summing point 15. As will be explained hereinafter, when the gains of the operational amplifiers 12 and 14 are adjusted such that the current $I_1$ exactly equals the current $I_2$, the current at summing point 15 will be zero and the analog bridge circuit will be balanced. The gain of operational amplifier 12 is set by adjusting a summing network $R_7$ in its feedback path. Similarly the gain of operational amplifier 14 is set by the parallel combination of a standard capacitor $C_2$ and an adjustable summing network $R_8$ in its feedback path. An error amplifier 16 amplifies any signal present at the summing point 15 indicating an unbalanced condition and presents it to the input 17 of a phase detector indicated generally by the reference numeral 18. The phase detector splits up the error signal into its real and imaginary components and presents the detected signal to respective reversible counting registers 19 and 20 in the controlling circuits for summing networks $R_7$ and $R_8$ respectively. The imaginary component of the error signal is sent to counting register 19 to control the summing network $R_7$ and the real component is sent to counting register 20 to control the summing network $R_8$. The phase detector 18 receives its reference voltage from the signal source 11 over conductor 21.

For a purpose which will be apparent the reference voltage is shifted in phase by 90°, 180°, and 270° before being presented to the phase detector 18. This is accomplished by standard phase shifting networks indicated by reference numerals 22, 23, and 24 respectively.

The four angular components of the reference signal are presented to the phase detector 18 at points 25, 26, 27, and 28 respectively.

A better understanding of the phase detector 18 may be gained with reference to a specific embodiment illustrated in FIGURE 3. FIGURE 3 illustrates a phase detector comprising four differential amplifiers 30, 31, 32, and 33 and their respective diode detectors 34, 35, 36, and 37. The differential amplifiers and diode detectors are standard in their operation and function to produce D-C voltages at the diode's outputs proportional to the absolute magnitude of the vector sum of their respective two input signals. The error signal $e_s$ from error amplifier 16 is supplied to one of the inputs of each of the differential amplifiers. A reference signal $e_r$ derived from signal source 11 through conductor 21 is split up into its four 90° angular components by the phase shifting networks 22, 23, and 24 and is sent to the other input of each differential amplifiers at points 25, 26, 27, and 28. The zero degree component of the reference signal is sent to differential amplifier 30 while the 180° component is sent to amplifier 31. In a like manner the 90° and the 270° components of the reference signal are sent to differential amplifiers 32 and 33 respectively. Thus the output of differential amplifier 30 is $e_s$ and $e_r$ and the output of differential amplifier 31 is $e_s - e_r$ shifted 90° from the output of differential amplifier 30. Since the diodes 34 and 35 are poled in the opposite directions, the outputs of differential amplifiers 30 and 31 are effectively subtracted vectorially at the summing point 38. As will be seen from the vector diagrams this output will be entirely real. The output of differential amplifier 32 is also $e_s$ plus $e_r$ and the output of differential amplifier 31 is $e_s - e_r$ shifted 90° from that of differential amplifier 31. Again the diodes 36 and 37 are poled in opposite directions so the outputs of 32 and 33 will be subtracted vectorially at summing point 39. The vector diagram will show that this output will be entirely imaginary.

Referring now to the vector diagram for differential amplifiers 30 and 31 shown in FIGURE 4, the error signal $e_s$ is arbitrarily indicated by a vector error in the first quadrant at some arbitrary angle. The reference signal $e_r$ at terminal 25 is shown along the zero degree axis and the inverted reference signal $-e_r$ at terminal 27 is shown along the 180° axis. The vector sum and vector difference of $e_s$ and $e_r$ are shown in the first and second quadrants respectively. The reciprocal of the vector difference of $e_s$ and $e_r$ is shown by a dotted line vector in the fourth quadrant. Finally the vector sum of the vectors $e_s$ plus $e_r$ and $(-e_s - e_r)$ is shown along the zero degree axis. From this vector diagram it is seen that the component of the error signal $e_s$ which is 90° out of phase with the reference signal $e_r$ produces equal and opposite D-C voltages from the diode detectors 34 and 35 respectively thereby producing a net output at terminal 38 which is totally real.

Referring now to the vector diagram of FIGURE 5 which is the vector diagram for differential amplifiers 32 and 33 the error signal $e_s$ is again shown in the first quadrant at some arbitrary angle. The 90° phase shifted reference signal $e_r$ at terminal 26 is shown along the 90° axis and its inverted signal at terminal 28 is shown along the 270° axis. The vector sum of $e_s$ and $e_r$ is shown in the first quadrant and the vector difference is shown in the fourth quadrant. The reciprocal of the vector difference of $e_s$ and $e_r$ is shown by a dotted line vector in the second quadrant. Finally the vector sum of the vectors $e_s$ plus $e_r$ minus $(e_s - e_r)$ is shown along the 90° axis. Thus again the vector diagram shows that the components of the error signal $e_s$ which are 90° out of phase with the reference signal $e_r$ produce equal and opposite D-C voltages which cancel each other out and leave a resultant voltage at terminal 39 which is totally imaginary. Thus again it is seen that the output voltage at 39 is a D-C voltage proportional to the absolute magnitude of the vector sum of $e_s$ and $e_r$ and is also proportional to the imaginary components of $e_s$. It will be noted that at a null condition or when $e_s$ equals 0, the output voltages at 38 and 39 will likewise be zero.

Figure 6:
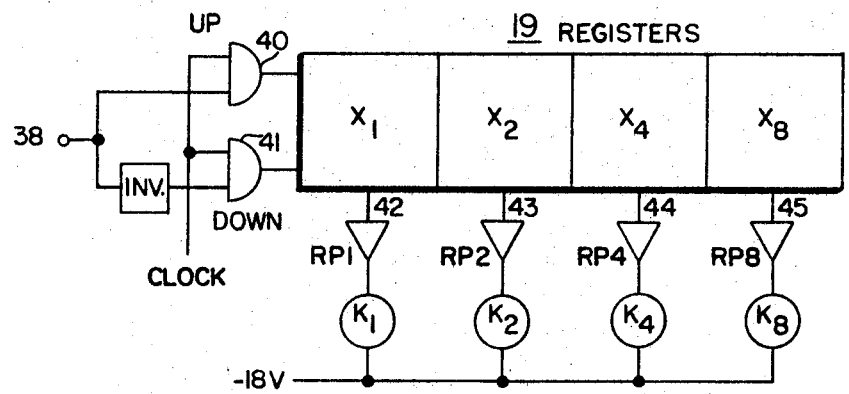
FIGURE 6 is a detailed illustration of the counting register used in the circuit of FIGURE 2.
Figure 7:
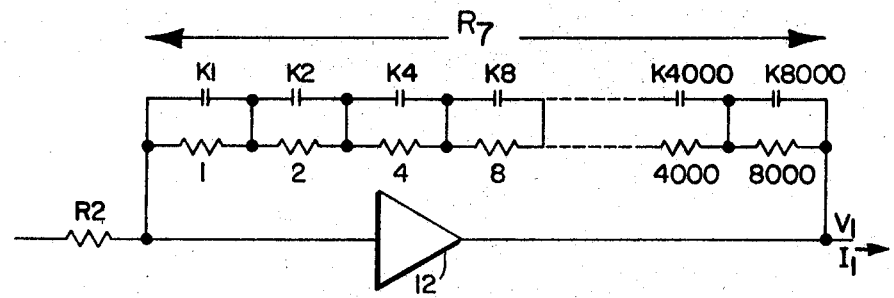
FIGURE 7 is a detailed illustration of a summing network used in the circuit of FIGURE 2.

Referring now to FIGURE 6, a four stage decade up-down counting register 19 is shown represented by four stages $X_1$, $X_2$, $X_4$, and $X_8$. The inputs to the counting register are from up gate 40 and down gate 41. The outputs 42–45 of counting register 19 control relay pullers $RP_1$, $RP_2$, $RP_4$, and $RP_8$ respectively. The use of a four stage counting register is merely exemplary and in no way is the invention to be limited thereby. It will be evident that the use of more stages will lend greater accuracy at a cost of greater expense. Therefore a number of stages used is clearly a matter of design dictated solely by the needs of the user. While the counting register shown in FIGURE 6 is indicated to be the counting register 19 of FIGURE 2, it should be understood that FIGURE 6 may also represent counting register 20 of FIGURE 2 in-as-much as their construction and operation are similar. The only difference between counting register 19 and counting register 20 is that in the former the input to up gate 40 and down gate 41 comes from terminal 38 of phase detector 18 while the inputs to the up and down gates of counting register 20 come from terminal 39. The up and down gates of both counting registers 19 and 20 are controlled by a digital clock which, for clarity in illustration, is not shown. It should be understood that the clock used in this invention is standard and its repetition rate is also merely a matter of design. In a preferred embodiment the counting registers are counted at a thirty cycle clock rate with a count signal applied to the most significant decade and then to succeeding decades as the input signals at 38 and 39 diminish respectively. Distributing the clock signal to various decades is accomplished by some standard sequential logic circuitry not shown but which is incorporated in the internal circuitry of the counting register. Control of the feedback network $R_7$ of operational amplifier 12 by the counting register 19 is effected by means of the register outputs being connected through relay pullers $RP_1$, $RP_2$, $RP_4$, and $RP_8$ to relays $K_1$, $K_2$, $K_4$, and $K_8$ and their respective contacts shown in FIGURE 7 connected in series with the various resistors in the feedback network $R_7$. By appropriately weighting the feedback resistors of network $R_7$ as indicated in FIGURE 7 the voltage output $V_1$ of the operational amplifier 12 is made directly proportional to the contents of the counting register 19. Thus by driving the counting register 19 in a direction indicated by the polarity of the error signal developed at point 38 of the phase detector, automatic balancing of the circuit, at least with respect to the component of the current at summing point 15 having a quadrature relationship with respect to the reference signal from 11, can be achieved. The circuit connections for counting register 20 and the feedback network $R_8$ for operational amplifier 14 are substantially similar to those described with respect to counting register 19 and the feedback network $R_7$ for operational amplifier 12. Thus by driving register 20 in the direction indicated by the polarity of the error signal $e_s$, derived at point 39 of the phase detector, the current output $I_2$ from operational amplifier 14 can be made to automatically vary a proportionate amount to achieve a null or a balanced condition with respect to the component of the current at summing point 15 having an in-phase relationship with respect to the reference signals from 11.

The operation of the circuit of FIGURE 2 can best be understood with reference to the equations of balance which are herein set forth. In accordance with operational amplifier theory the output voltage is equal to the product of input current and feedback impedance. Since substantially no current will exist at null balance, the currents $I_1$ and $I_2$ can be determined from the following relationships:

(1)
$$I_1 = \frac{K_1 R_7}{R_x + j\omega L}$$

(2)
$$I_2 = -K_2 \frac{R_8 \frac{1}{j\omega C_2}}{R_8 + \frac{1}{j\omega C_2}} = -\frac{K_2}{R_6} \frac{R_8}{j\omega C_2 R_8 + 1}$$

Since $R_6$ is constant, let $$\frac{K_2}{R_6} = K_3$$

and $$I_2 = -K_3 \frac{R_8}{j\omega C_2 R_8 + 1}$$

(3) At balance $$I_1 + I_2 = 0$$

$$K_1 \frac{R_7}{R_x + j\omega L} - K_3 \frac{R_8}{j\omega C_2 R_8 + 1} = 0$$

(4) Cross multiplying $$jK_1 R_7 \omega C_2 R_8 + K_1 R_7 = K_3 R_8 R_x + jK_3 \omega L R_8$$

(5) Equating imaginary terms $$K_1 R_7 \omega C_2 R_8 = K_3 \omega L R_8$$
$$K_1 R_7 C_2 = K_3 L$$

Since $C_2$ is constant we may state $$L = K_4 R_7$$

L is proportional to $R_7$ which in turn is proportional to counting register 19 (FIG. 2).

(6) Equating real terms $$K_1 R_7 = K_3 R_8 R_x$$

substituting $L/K_4$ for $R_7$ $$\frac{K_1}{K_4} L = K_3 R_8 R_x$$

$$R_8 = \frac{K_1}{K_3 K_4} \frac{L}{R_x}$$

Since $Q = \omega L/R_x$, for a particular frequency, Q is proportional to $R_8$ which in turn is proportional to counting register 20.

It should be observed that $\omega$, the frequency term, is eliminated from the final results showing that the measurement is independent of frequency. The system, therefore, has the advantage of requiring no frequency standard. Q, for a desired frequency, may be determined by a measurement made at any frequency if we assume that $R_x$ and L remain constant with variation in frequency. Since this assumption depends on the type of component measured, this system would normally be operated at a test frequency which is reasonably close to the frequency on which Q is based.

Figure 8:
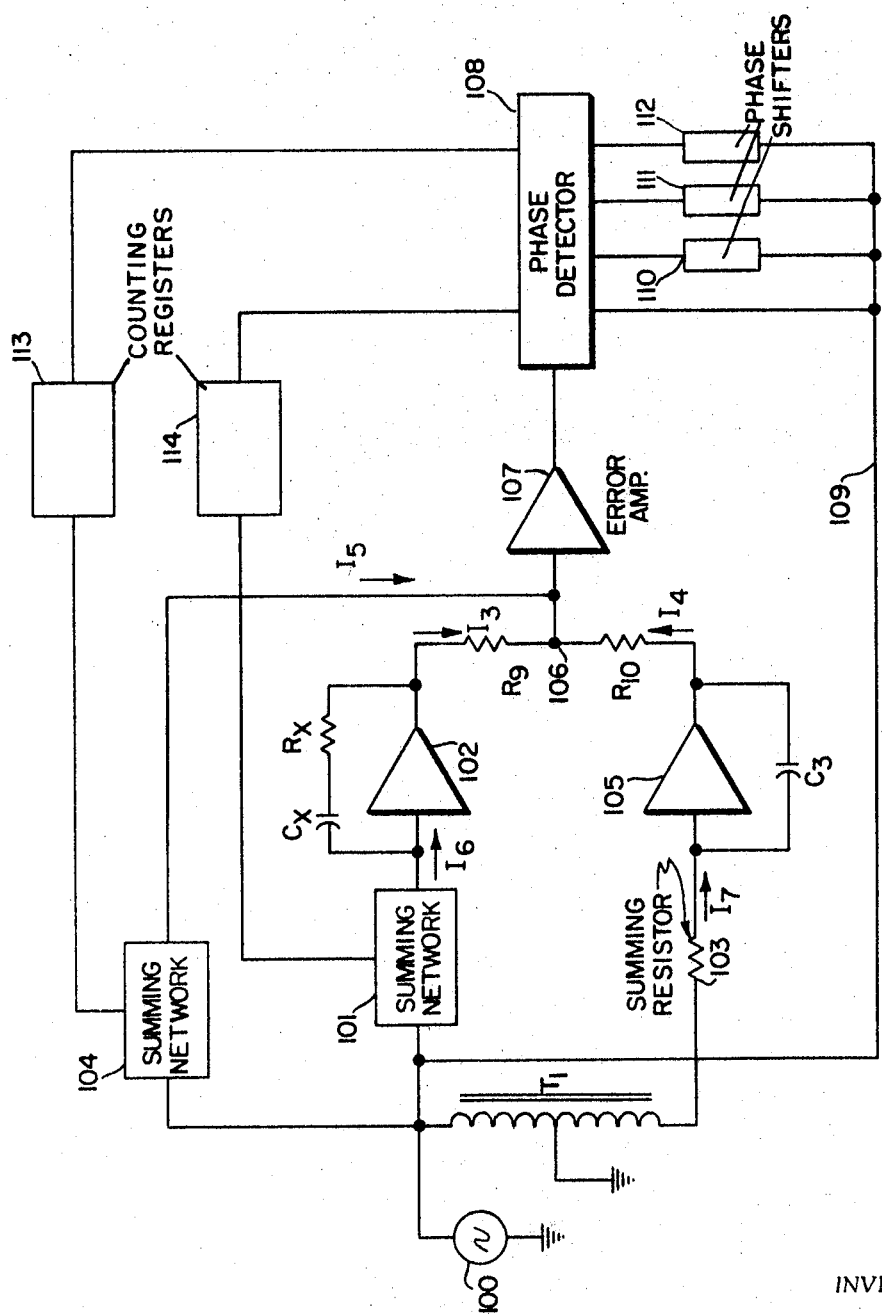
FIGURE 8 is an improved circuit used to measure capacitance and dissipation factor of an unknown capacitor.

FIGURE 8 depicts an analog circuit for measuring the capacitance and dissipation factor of an unknown capacitor. A signal source 100 presents a signal to summing network 101 in the input circuit to operational amplifier 102 and to summing network 104 in a feedback circuit between the input 105 to an error amplifier 107 and the signal source 100. An inverted signal from signal source 100 is presented to the input summing resistor 103 for an operational amplifier 105 through an inverting transformer $T_1$. The unknown capacitor represented by its equivalent series resistance $R_x$ and its pure capacitance $C_x$ is placed in the feedback path for operational amplifier 102. Similarly a standard capacitor $C_3$ is placed in the feedback loop of operational amplifier 105. An output current $I_3$ from operational amplifier 102 is developed by a fixed resistor $R_9$ and an output current $I_4$ from operational amplifier 105 is developed by a fixed resistor $R_{10}$. The currents $I_3$ and $I_4$ flowing through resistors $R_9$ and $R_{10}$ are summed together at point 105 together with the feedback current $I_5$ flowing through summing network 104. The current at point 105 representing the error signal $e_s$ is presented to error amplifier 107 from which it is presented to phase detector 108. The operation of phase detector 108 is similar to that of the phase detector depicted in FIGURE 2 and therefore does not require a detailed discussion. Thus, the phase detector 108 receives the four angular components of a reference signal $e_r$ from source 100 through conductor 109 and phase shifting networks 110, 111, and 112 and presents D.C. signals proportional to the real and imaginary components of the error signal from error amplifier 107 to counting register 113 and 114 respectively. In a manner similar to the operation of the counting registers described with reference to FIGURE 2, the counting registers 113 and 114 control the resistances of summing networks 104 and 101 respectively.

It will be noted that the summing network 101 which controls the gain of operational amplifier 102, is placed in its input circuit rather than in its feedback circuit as described with respect to the summing network $R_7$ in FIGURE 2. This requires that the individual resistors in the summing network be weighted by conductance and connected in parallel instead of the series arrangement for the feedback network $R_7$. This is shown in more detail in FIGURE 7. Thus, while the resistors in network $R_7$ were shown to get progressively larger in ratios of a binary code going from the least significant decade to the most significant decade, the resistors in summing network 101 must get progressively smaller in the same direction. The placement of the summing network for the operational amplifier, and therefore the weighted values of the various resistors in the summing network are, of course, merely a matter of design considerations; and, it will be obvious to those skilled in the art that the two configurations are functionally equivalent in that the gain of the associated operational amplifier is varied thereby. Therefore it is not applicant's intention to be limited to the particular configurations shown in FIGURES 2 and 8. Rather the reason for the distinction between FIGURES 2 and 8 in this regard is merely to illustrate an example of each configuration.

While the operation of the various components in the circuit of FIGURE 8 are similar to their counterparts in FIGURE 2, the general operation of the circuit as a whole can best be understood with reference to the equations of balance which are herein set forth:

(1) $$I_3 = -\frac{I_6(R_x + jX_x)}{R_9}$$

(2) $$I_4 = -\frac{I_7(jXC_3)}{R_{10}}$$

where $I_3$ is the current flowing through $R_1$
$I_4$ is the current flowing through $R_2$
$I_5$ is the current flowing through summing network $R_{DF}$
$I_6$ is the input current to operational amplifier 102
$I_7$ is the input current to operational amplifier 105
$R_x$ is the equivalent series resistance of the unknown capacitor
$X_x$ is the reactance of the unknown capacitor and
$XC_3$ is the reactance of the standard capacitor $=1/wC_3$ (3) $$I_3 + I_4 + I_5 = 0$$

at balance substituting from (1) and (2)

(4) $$\frac{-I_6(R_x+jX_x)}{R_9} + \frac{-jI_7XC_3}{R_{10}} + I_5 = 0$$

Since $R_9$, $R_{10}$, $I_7$ and $XC_3$ are constants for given frequency, Equation 4 can be written (5) $$K_1I_6(R_x+jX_x) + jK_2 + I_5 = 0$$

Equating reals and imaginaries (6) $$K_1I_6X_x + K_2 = 0$$

(7) $$K_1I_6R_x + I_5 = 0$$

rearranging (6) and (7)

(8) $$I_6 = \frac{-K_2}{K_1X_x} \alpha C_x$$

(9) $$I_5 = -K_1I_6R_x$$

substituting (8) into (9)

(10) $$I_5 = \frac{K_2R_x}{X_x} \alpha DF$$

From the solutions of the balance equations it is seen that $I_6$ is directly proportional to the unknown capacitance $C_x$, and $I_5$ is directly proportional to the dissipation factor DF for a particular frequency. As in the circuit of FIGURE 2, the summing networks 101 and 104 in FIGURE 8 which develop $I_6$ and $I_5$ respectively are controlled by the counting registers 114 and 113 in such a way that the currents are directly proportional to the contents of their respective registers. By driving the counting registers with signals proportional to the appropriate components of the error signal developed at point 105, automatic balancing of the system is achieved. Thus, at balance, the summing networks 101 and 104 contain digital indications proportional to the values of $C_x$ and DF respectively.

Figure 9:
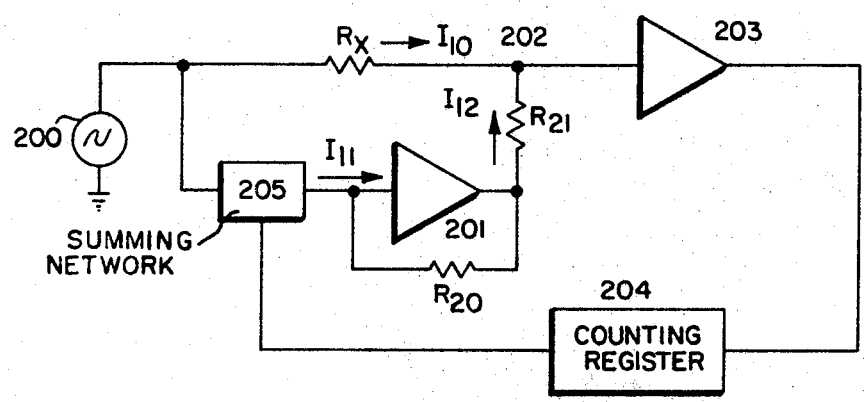
FIGURE 9 is an analog bridge circuit used to measure the resistance of an unknown resistor.

FIGURE 9 depicts a circuit for automatically determining the resistance $R_x$ of an unknown resistor. Signal source 200 develops a current $I_{10}$ flowing through an unknown resistor $R_x$ which is presented to summing point 202. The signal from source 200 also develops a current $I_{11}$ through a summing network 205 which is presented to the input of operational amplifier 201. The feedback circuit for operational amplifier 201 contains a fixed resistor $R_{20}$. The output of operational amplifier 201 develops a current $I_{12}$ through a fixed resistor $R_{21}$ which is summed with current $I_{10}$ at summing point 202. The current at point 202 is amplified by error amplifier 203 which presents its output to a counting register 204. Since no imaginary components are involved in measuring a totally resistive parameter, there is no need for the phase detector which is necessary when measuring inductance or capacitance. In a similar manner to the counting registers described before, register 204 controls the summing network 205 in such a way that the currents at summing points 202 tend to balance. The equations of balance for the circuit shown in FIGURE 9 are herein set forth:

(1) $$I_{10} = -I_{11}R_{20}/R_{21}$$

(2) $$I_{12} + I_{10} = 0$$

at balance substituting (1) into (2)

(3) $$\frac{-I_{11}R_{20} + I_{10}}{R_{21}} = 0$$

since $R_{21}$ and $R_{20}$ are held constant (4) $$I_{10} \alpha I_{11}$$

From the balance equations it is seen that the current $I_{10}$ flowing through the unknown resistor $R_x$ is proportional to the current developed by the summing network 205. Since the current $I_{10}$ is proportional to the unknown resistance $R_x$, and since further the current $I_{11}$ is proportional to the resistance of the summing network 205, it is evident that at balance the resistance 205, which is determined by the contents of counting register 204, will be proportional to the unknown resistance $R_x$.

Ranging of the circuits of this invention can easily be provided by changing the attenuation ratios of the various resistors in the summing networks and by changing the values of the various fixed resistors in the circuits. The accuracy of the system is primarly determined by the accuracy of the values of the standard elements used as well as the number of decades used in the counting registers and summing networks. As previously mentioned the circuits of this invention are relaitvely insensitive to minor variations in frequency of the input signal.

In all of the above embodiments it is seen that when the analog circuit has attained a balanced condition, the contents of the various counting registers provide a digital indication proportional to the values of the unknown parameters under measurement. This digital indication can take any convenient form such as arabic numerals displayed in a binary, a decimal, or any other convenient code. The outputs of the counting registers can be additionally used to control some external process such as, for example, the manufacturing process for the circuit components under measurement. Thus, by means of this invention, a quality control system can easily be obtained.

What I claim as new and desire to secure by Letters Patent of the United States is:

1. A circuit for measuring electrical parameters including,
   (a) an analog comparison circuit including a pair of transmission paths,
   (b) a reference signal source coupled to said analog circuit for applying said signal to said paths,
   (c) gain control elements connected in each of said paths for determining the output currents thereof,
   (d) a standard impedance located in one path,
   (e) an unknown impedance, the electrical parameter of which is being measured, located in another path,
   (f) means for partly determining the gain of one controlled element comprising said standard impedance,
   (g) means for partly determining the gain of the other controlled element comprising said unknown impedance,
   (h) means for converting the output currents of said paths into digital signals, the number of signals being determined by the number of electrical parameters being measured,
   (i) means for controlling the gain of said controlled elements with said digital signals such that said output currents tend toward a constant value, and
   (j) means for registering digital expressions proportional to the values of the parameters under measurement when said output currents have attained a constant value.

2. The circuit as described in claim 1 wherein:
   (a) said converting means comprises a phase detector coupled to said reference signal source for segregating the analog output currents into its real and imaginary components and which further comprises a pair of digital registers respectively controlled by said real and imaginary components.

3. The circuit as described in claim 2 wherein:
   (a) one of said pair of digital registers controls the gain of said one controlled element which is being determined by said standard impedance, and
   (b) the other of said pair of digital registers controlling the gain of said other controlled element which is being determined by the unknown impedance.

4. The circuit as described in claim 3 wherein the controlled elements comprise operational amplifiers.

5. An arrangement according to claim 1 wherein said gain controlled elements comprise operational amplifiers having gain controlling resistors and said means for converting the output currents into digital signals comprise reversible counters whose count controls the value of the resistors in respective ones of said gain controlled elements.

6. A circuit for measuring the inductance and quality factor of an unknown inductor comprising:
   (a) an analog comparison circuit including a pair of transmission paths,
   (b) a reference signal source for supplying reference signals to said paths,
   (c) a first gain controlled element and said inductor connected in said first path,
   (d) means for determining the gain of said first element comprising a first variable resistance,
   (e) a second gain controlled element located in said second path,
   (f) means for determining the gain of said second element comprising a standard impedance and a second variable resistance,
   (g) means responsive to the output currents developed in said paths for algebraically summing them at a summing point,
   (h) means responsive to the components of current at said summing point having in-phase and quadrature phase relationship with respect to said reference signals for developing a pair of current signals proportional to said in-phase and quadrature phase components respectively,
   (i) means for converting said pair of current signals into a pair of proportional digital signals respectively,
   (j) the digital signal related to said in-phase component of current at said summing point controlling said first variable resistance such that the in-phase component of the current at said summing point tends toward zero,
   (k) the digital signal related to said quadrature phase component of the current at said summing point controlling said second variable resistance such that the quadrature phase component of the current at said summing point tends toward zero,
   (l) said first variable resistance being proportional to said unknown inductance when the in-phase component of the current at said summing point reaches zero, and
   (m) said second variable resistance being proportional to said quality factor when the quadrature phase component of the current at said summing point reaches zero.

7. A circuit for measuring the capacitance and dissipation factor of an unknown capacitor comprising,
   (a) a comparison circuit including a pair of transmission paths,
   (b) a reference signal source coupled to said paths for supplying reference signals of opposite phase thereto,
   (c) a first gain controlled element, and an unknown capacitor under measurement and a first variable impedance for controlling the gain of said first gain controlled element connected in said first path,
   (d) a second gain controlled element and a standard impedance for controlling the gain of said second element,
   (e) means for developing two currents from said first and second gain controlled elements respectively and for summing them together at a summing point,
   (f) means including a second variable resistance for presenting a third current to said summing point, said means being connected to said reference signal source,
   (g) means for segregating the current at said summing point into its real and imaginary components and for developing a pair of current signals proportional to said real and imaginary components respectively,
   (h) means for converting said pair of current signals into a pair of proportional digital signals respectively, the digital signal related to said imaginary component controlling said first variable resistance such that the imaginary part of said current at said summing point tends toward zero,
   (i) the digital signal related to said real component controlling said second variable resistance such that the real component of said current at said summing point tends toward zero,
(j) said first variable resistance being proportional to said unknown capacitance when said imaginary component of the current at said summing point reaches zero, and
(k) said second variable resistance being proportional to said dissipation factor when the real component of the current at said summing point reaches zero.

8. A circuit for measuring the resistance of an unknown resistor comprising:
(a) first and second transmission paths,
(b) a reference signal source,
(c) a first gain controlled element, the gain of which is controlled by a standard resistance and a variable impedance coupled in said first path,
(d) means for coupling said unknown resistor in said second path,
(e) means for presenting said reference signal to said unknown resistor in said second path and also to said gain controlled element in said first path, thereby producing a pair of currents,
(f) means for summing said pair of currents at a summing point,
(g) means for converting the current at said summing point into a digital signal proportional thereto,
(h) said digital signal controlling said variable impedance such that the current at said summing point tends toward zero, and
(i) the value of said variable impedance being proportional to said unknown resistor when the current at said summing point reaches zero.

9. In combination:
(a) a source of alternating reference signals,
(b) a first electrical circuit responsive to said reference signals to produce a first current,
(c) a second electrical circuit responsive to said reference signals to produce a second current,
(d) said first electrical circuit comprising a first current controller and an unknown impedance,
(e) said second electrical circuit comprising a second current controller and a known impedance,
(f) means to algebraically combine the first and second currents to provide an error signal representing the difference in amplitude and phase thereof,
(g) means responsive to the component of the error signal in quadrature phase with the reference signal to produce a first control signal and responsive to the component of the error signal in phase with respect to the reference signal to produce a second control signal,
(h) means comprising said first current controller responsive to said first signal to control said first current in said first circuit to reduce the quadrature component in the error signal to zero,
(i) means comprising said second current controller responsive to said second signal to control said second current in said second circuit to reduce the in-phase component in the error signal to zero.

10. In combination:
(a) a source of reference signals,
(b) a first electrical circuit responsive to said reference signals to produce a first current,
(c) a second electrical circuit responsive to said reference signals to produce a second current,
(d) said first electrical circuit comprising a first operational amplifier and an unknown impedance, said first operational amplifier comprising a gain controlling resistance,
(e) said second electrical circuit comprising a second operational amplifier and a known impedance, said second operational amplifier comprising a gain controlling resistance,
(f) means to algebraically combine the first and second currents to provide an error signal representing the difference in amplitude and phase thereof,
(g) means responsive to the component of the error signal in quadrature phase with the reference signal to produce a first control signal and responsive to the reference signal to produce a second control signal,
(h) first control means responsive to said first signal to adjust the value of the resistance of said first amplifier to reduce the quadrature component in the error signal to zero,
(i) second control means responsive to said second signal to adjust the value of the resistance of said second amplifier to reduce the in-phase component in the error signal to zero.

11. An arrangement according to claim 10 wherein said first and second control means each comprise a reversible counter and means responsive to the count in said reversible counters for adjusting the values of respective ones of the resistances of the associated amplifiers.

12. In combination:
(a) a source of reference signals,
(b) a first electrical circuit responsive to said reference signals to produce a first current,
(c) a second electrical circuit responsive to said reference signals to produce a second current,
(d) said first electrical circuit comprising a first current controller and an unknown impedance,
(e) said second electrical circuit comprising a second current controller and a known impedance,
(f) means to algebraically combine the first and second currents to provide an error signal representing the difference in amplitude and phase thereof,
(g) means responsive to the component of the error signal having a first phase relationship with the reference signal to produce a first control signal and responsive to the component of the error signal having a second phase relationship with respect to the reference signal to produce a second control signal,
(h) first control means comprising said first current controller responsive to said first signal to control said first current in said first circuit to reduce the first phase relationship component in the error signal to a given value,
(i) second control means comprising said second current controller responsive to said second signal to control said second current in said second circuit to reduce the second phase relationship component in the error signal to a given value.

13. An arrangement according to claim 12 wherein said first control means comprises a counter responsive to the first control signal for providing a count indication of the value of the reactance component of the unknown impedance and means responsive to the count indication to control the first current in said first circuit, and said second control means comprises a counter responsive to the second control signal for providing a count indication of the value of the resistance component of the unknown impedance and means responsive to the count indication to control the second current in said second circuit.

14. In combination:
(a) a source of reference signals,
(b) a first electrical circuit and means to apply said reference signals to said first circuit to produce a first current,
(c) a second electrical circuit and means to apply said reference signals to said second circuit to produce a second current,
(d) said first electrical circuit comprising an operational amplifier and an unknown impedance,
(e) said second electrical circuit comprising an operational amplifier and a standard impedance,
(f) means to algebraically combine the first and second currents to provide an error signal representing the difference in amplitude and phase thereof, (g) means responsive to the component of the error signal having a quadrature phase relationship to the reference signals to control the amplitude of the reference signals applied to the unknown impedance in said first circuit and to the component of the error signal having an in-phsae relationship to the reference signals to control the amplitude and phase of the reference signals applied to the standard impedance in said second circuit.

References Cited

UNITED STATES PATENTS

| | | | |
|---|---|---|---|
| 2,629,843 | 2/1953 | Berry | 324—62 XR |
| 2,782,102 | 2/1957 | Howe | 324—62 XR |
| 2,972,106 | 2/1961 | Hyrne | 324—99 XR |
| 3,034,044 | 5/1962 | Konigsberg | 324—57 |
| 3,159,787 | 12/1964 | Sexton et al. | 324—123 XR |
| 3,284,634 | 11/1966 | Redwood | 330—124 XR |
| 3,301,056 | 1/1967 | Blanchard et al | 324—99 XR |

RUDOLPH V. ROLENEC, *Primary Examiner.*

E. E. KUBASIEWICZ, *Assistant Examiner.*

U.S. Cl. X.R.

235—177; 324—99